United States Patent Office 3,370,918
Patented Feb. 27, 1968

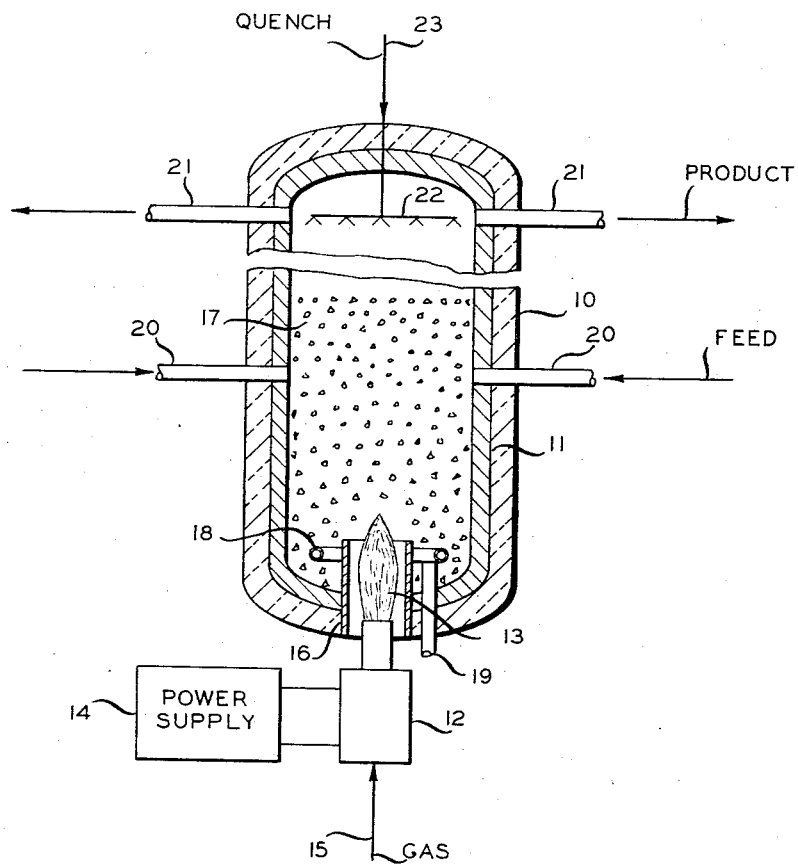

3,370,918
FLUIDIZED PROCESS AND
APPARATUS THEREFOR
John W. Begley, Bartlesville, Okla., assignor to Phillips
Petroleum Company, a corporation of Delaware
Filed Dec. 26, 1963, Ser. No. 333,420
13 Claims. (Cl. 23—151)

ABSTRACT OF THE DISCLOSURE

Endothermic chemical reactions are promoted and controlled by heating a lower portion of a bed of refractive particles within a reactor to the desired reaction temperature by a plasma flame, passing the hot particles to a vaporous feed stream in the intermediate part of the reactor wherein thermal energy is transferred from the hot particles to the vaporous feed stream and the desired product or products are formed, and then quenching the reaction with a cooled liquid stream. The product or products are then withdrawn from the reaction zone and the cooled particles gravitate to the bottom of the zone near the plasma flame wherein they are again heated to the desired reaction temperature.

---

This invention relates to an improved fluidized process and apparatus therefor. In another aspect, this invention relates to an improved process for the production of acetylene and hydrogen cyanide.

Acetylene and hydrogen cyanide are conventionally produced from a vaporous hydrocarbon, preferably methane, and ammonia by employing a nitrogen or hydrogen plasma. Streams of plasma, which have been defined as consisting of neutral gas, ions and electrons, at high temperatures, have been observed as physical phenomena for many years, for example in connection with electric arcs. Such streams have been employed to achieve very high temperatures for short periods of time. Plasma streams have commercial use in arts such as cutting, welding, metalizing, ceramic coating, surface treating, sintering, chemical synthesis, etc. Recently, plasma streams or jets have been employed in the field of high temperature chemical reactions whereby reactants, especially normally gaseous hydrocarbons, are contacted with a high temperature plasma stream to effect heating and cracking of the reactants to less saturated materials and more often to more desirable and useful products.

In the production of acetylene and hydrogen cyanide from ammonia and a vaporous hydrocarbon employing a hydrogen or nitrogen plasma, product yield is reduced appreciably due to the extreme non-uniformity of reaction temperatures which occur when the vaporous hydrocarbon and ammonia are mixed with the plasma jet.

Accordingly, an object of my invention is to provide a fluidized process and apparatus therefor.

Another object of my invention is to provide a fluidized process and apparatus for utilizing a plasma torch.

Another object of my invention is to provide a process for the production of acetylene utilizing a plasma jet or stream.

Other objects, advantages and features of my invention will be readily apparent to those skilled in the art from the following description, the drawing and the appended claims.

Broadly, according to my invention, a fluidized bed is contacted with a plasma jet or stream and the heated fluidized particles employed as a high temperature heat exchange medium. The invention is particularly applicable to chemical reactions, particularly hydrocarbon cracking reactions, when conducted in a vertical plasma stream reactor wherein a fluidized bed is contacted with a plasma jet or stream in the lower region of said reactor and the heated bed particles passed from said lower region into the reaction zone of said reactor.

Although not to be limited thereto, the present invention is particularly suitable for the production of hydrogen cyanide and acetylene, employing hydrogen and nitrogen plasma. Extreme temperature differences in the reaction zone normally present when employing a plasma jet are eliminated by the utilization of a graphite or carbon fluidized bed to introduce the required endothermic heat to the reaction zone at a temperature lower than the plasma temperature.

The drawing is an elevated vertical cross-sectional view of one embodiment of the inventive reactor.

Referring to the drawing, the inventive reactor comprises a vertical vessel 10 having a high temperature lining 11, such as graphite. A plasma torch apparatus generally designated by reference numeral 12 is connected to vessel 10. Plasma flame generators and plasma stream producing devices are known in the art. Plasma torch 12 can be any suitable known plasma flame generator capable of generating a high temperature plasma stream 13 shown extending into vessel 10. Suitable plasma flame generators that can be employed are disclosed in U.S. Patent 2,960,594, Thorpe, issued Nov. 15, 1960, and U.S. Patent 2,922,869, Giannini et al., issued Jan. 27, 1960.

Torch 12 is connected to a suitable source of electrical power or supply 14 connected to suitable electrodes (not shown) within plasma torch 12 to heat and ionize the plasma forming material or gas. The plasma stream apparatus or generator that can be employed is preferably energized with direct current. However, alternating current can be employed. The plasma forming gas employed in the torch will form a sheath around the arc within the torch. The plasma forming gas is converted in the nozzle of the torch to a free plasma and leaves the nozzle and passes out of contact with the arc as a free plasma stream being projected from the nozzle. The plasma forming gas is passed into the bottom of vessel 10 and into a zone isolated from the remainder of vessel 10 by a baffle member 16. The plasma forming gas is passed into vessel 10, preferably at a velocity and/or pressure drop sufficient that same will emerge from the nozzle as a free plasma stream having a velocity of at least 5 and preferably at least 50 feet per second. Plasma flame temperatures ranging from 3000° F. to 30,000° F. can be achieved depending upon the type of apparatus employed, the plasma forming gas and other considerations. When employing hydrogen, a plasma flame temperature of about 9200° F. is attained and when employing nitrogen, a plasma flame temperature of about 13,200° F. can be attained. If desired, mixtures of various gases or other materials can be employed as the plasma forming material for operational reasons rather than chemical action reasons. For example, a mixture of hydrogen and argon has been successfully operated for reducing the arc voltage required by the use of pure hydrogen.

Ordinarily the voltage impressed between the nozzle of the torch and the flame electrode is in the range of 20 volts to 1500 volts so as to effect current flow between the nozzle and electrodes in the range of 20 amperes to 2000 amperes. The electrode positions are important to the efficient and stable operation of the plasma generating apparatus. It is generally desirable for such apparatus to convert as much as possible the plasma gas flowing through the apparatus into the actual plasma. This avoids waste of gas and also avoids the detrimental cooling effect of gas below plasma temperature. For the proper operation of a plasma torch apparatus, it is important that the flow of plasma gas be properly coordinated with the flow of electric current to the arc. It is generally advisable to start the plasma gas flowing before igniting the arc and then to ignite the arc only at low amperage, afterwards gradually increasing the current input to the arc.

Vessel 10 contains a bed of solid particles 17. A means of fluidizing said bed of solid particles is positioned in the lower region of vessel 10 and comprises a vaporous dispersing means 18 and a conduit means 19 for transmitting a fluidizing gas to the said vaporous dispersing means 18. Sufficient volume is maintained above the fluidized bed to insure substantially complete separation of the bed particles from a fluid mixture flowing from vessel 10. It is within the scope of this invention to aid the separation of bed particles from the fluid phase by employing cyclones and other separation means such as baffles in the upper region of vessel 10. Examples of suitable refractory materials that can be employed in the fluidized bed include alumina, magnesia, chromium oxide, zirconia, thoria, calcia, graphite and carbon.

As illustrated, multiple conduit means 20 are positioned so as to provide a means of transmitting a fluid or fluids to an intermediate region (reaction zone) of vessel 10. Although two conduit inlet means are herein illustrated, it is within the scope of this invention to employ additional conduit inlet means, or to employ only a single conduit inlet means. It is within the scope of this invention to pass a portion of a fluid or fluids passed through conduit means 20 to vaporous dispersing means 18, thereby utilizing as a fluidizing gas a portion of the feed fluid or fluids passed to the reaction zone of vessel 10.

A conduit outlet means 21 is provided in the upper region of vessel 10. Although two conduit outlets are herein illustrated, it is within the scope of this invention to employ additional conduit outlets or to employ only a single conduit outlet.

A fluid dispersing means 22 is positioned in the upper region of vessel 10, said dispersing means 22 capable of directing a quenching fluid into a region or zone below the product withdrawal zone (conduit outlet means 21) of vessel 10. A quenching fluid can be directed to dispersing means 22 via conduit means 23.

Although not to be limited thereto, the invention will hereinafter be described as it is applied to the production of acetylene and hydrogen cyanide. A plasma forming gas, such as hydrogen or nitrogen, is introduced into torch 12 via conduit means 15. The gas introduced into torch 12 via conduit means 15 is passed to an arc produced by high density current between two suitable electrodes (not shown) within torch 12 to heat the hydrogen above the disassociation temperature and exits torch 12 as plasma flame or stream 13 within a zone of vessel 10 protected by baffle means 16. Within vessel 10, the fluidized particle bed comprising carbon or graphite particles is contacted with the high temperature plasma stream 13. The heated fluidized particles are transported from the lower region of vessel 10 into the intermediate region or reaction zone of vessel 10. By utilizing fluidized particles to transmit the heat from the plasma flame to the reaction zone, substantially uniform temperatures can be maintained within the reaction zone resulting in substantially higher reaction product yields.

A vaporous paraffinic hydrocarbon and ammonia feed mixture is passed to the reaction zone of vessel 10 via conduit means 20. A hydrocarbon or water quench fluid is passed via conduit means 23 to dispersing means 22 and thence into the upper region of vessel 10. The quench fluid reduces the temperature of the reaction zone effluent below the reaction or cracking temperature of the hydrocarbon feed passed to vessel 10. Product acetylene and hydrogen cyanide are withdrawn from vessel 10 via conduit means 21.

Circulation of the fluidized particles within vessel 10 will result in the heated particles being transported upwardly to the reaction zone and the cooled particles being passed downwardly to the bottom of vessel 10 where they are heated by the plasma stream. The diameter of the particles is normally in the range of .001 inch to ½ inch. Plasma flame temperatures in the range of 9200° F. to 13,200° F. are maintained in the bottom of vessel 10 while temperatures in the range of 1300° C. to 2000° C. are maintained in the intermediate or reaction zone of vessel 10. By manipulating the rate of flow of reactants to the reaction zone, the temperature throughout the reaction zone can be maintained substantially constant.

With the reactant feed to the reaction zone comprising methane and ammonia, the mol ratio of methane to ammonia is maintained in the range of 1:1 to 5:1. The temperature of the reaction zone is maintained in the range of 1300–2000° C. A hydrocarbon or water quench fluid is introduced via dispersing means 22 so as to lower the temperature of the reaction zone effluent to below 1000° F. A reaction product mixture comprising quench fluid, acetylene, hydrogen cyanide, acetonitrile, hydrogen, carbon, and nitrogen is withdrawn from vessel 10 via conduit means 21. The effluent withdrawn from vessel 10 can be separated by a conventional process such as water washing to separate acetonitrile and hydrogen cyanide from the reaction zone effluent and passing the effluent gas from the water washing zone to an adsorber wherein the acetylene is selectively adsorbed by contact with a selective solvent such as dimethylformamide.

An advantage of the invention is readily apparent when a nitrogen plasma is employed in the production of hydrogen cyanide and acetylene. The equations and free energies of formation at various reaction temperatures of HCN, CN and $C_2N_2$ (cyanogen) from the elements are as follows:

(1) $$C + \tfrac{1}{2}N_2 + \tfrac{1}{2}H_2 \rightarrow HCN$$

| T, °K.: | $\Delta F_f$ |
| --- | --- |
| 1500 | 19.23 |
| 2000 | 15.43 |
| 3000 | 7.83 |
| 4000 | 0.18 |
| 5000 | −7.52 |
| 6000 | −15.23 |

(2) $$C + \tfrac{1}{2}N_2 \rightarrow CN$$

| T, °K.: | $\Delta F_f$ |
| --- | --- |
| 1500 | 57.70 |
| 2000 | 45.97 |
| 3000 | 23.04 |
| 4000 | 0.65 |
| 5000 | −21.30 |
| 6000 | −42.86 |

(3) $$2C + N_2 \rightarrow NC\text{—}CN$$

| T, °K.: | $\Delta F_f$ |
| --- | --- |
| 1500 | 58.38 |
| 2000 | 50.01 |
| 3000 | 42.38 |
| 4000 | 31.94 |
| 5000 | 21.68 |
| 6000 | 11.63 |

The above data clearly indicate that at the high temperatures possible for a nitrogen plasma nitrogen can be fixed to HCN or cyanogen. Therefore, the inventive reactor would require less ammonia to produce an equivalent amount of hydrogen cyanide than would be required by conventional processes employed to produce hydrogen cyanide and acetylene from ammonia and vaporous hydrocarbons. Therefore, the heat requirements for the production of acetylene and hydrogen cyanide by the inventive reactor would be less by an amount equal to the difference in the heat of formation for ammonia (−11.04 K. calories) and nitrogen (0) times the number of atoms of nitrogen fixed. This would normally range between 10 and 20 percent of the total energy requirements normally employed in the production of acetylene and hydrogen cyanide from ammonia and a vaporous hydrocarbon.

Various modifications of this invention can be made, or followed, in view of the foregoing disclosure and discussion, without departing from the spirit or scope thereof.

I claim:

1. Apparatus comprising a vertical vessel, a bed of solid refractory particles positioned within said vessel, means for introducing a plasma flame into the lower portion of said bed, means for fluidizing and passing plasma heated particles upwardly into an intermediate region of said vessel, first conduit means in communication with said intermediate region of said vessel, and second conduit means in communication with the upper region of said vessel.

2. The apparatus of claim 1 to include means for introducing a quenching fluid into said vessel below said second conduit means.

3. The apparatus of claim 2 wherein said means for fluidizing comprises a means for upwardly dispersing a gas throughout the cross section of said bed of particles.

4. The apparatus of claim 3 wherein said vessel is lined with a refractory material.

5. The apparatus of claim 4 wherein said refractory material is graphite, said bed of refractory particles comprises particles selected from the group consisting of graphite particles and carbon particles, and said plasma flame is selected from the group consisting of nitrogen plasma flame and hydrogen plasma flame.

6. The apparatus of claim 5 wherein said means for introducing a plasma flame into said bed comprises a vertical cylindrical baffle connected to the lower region of and projecting into the interior of said vessel, said vertical cylindrical baffle having a plasma flame producing means positioned axially therein.

7. Apparatus of claim 6 wherein said means for upwardly dispersing a gas comprises a series of nozzle means positioned about said cylindrical baffle, and means to supply said gas thereto.

8. The apparatus of claim 7 wherein said means for introducing quenching fluid comprises a series of nozzles positioned above said bed and below said second conduit means, and means for introducing a quenching fluid to said nozzles.

9. A process of promoting and controlling endothermic chemical reactions comprising:

(a) heating the lower portion of a bed of substantially non-reacting refractory particles in a reaction vessel with a plasma jet while simultaneously passing a fluidizing gas upward through said bed to thereby pass the heated particles upward to an intermediate region of said reaction vessel and causing the particles in the upper portion of said bed to move downward;

(b) contacting the upwardly moving heated particles in the intermediate region of said reaction vessel with vaporous reactive feed materials to thereby pass thermal energy to said feed materials from said heated particles and cause a vaporous product or products to form.

10. The process of claim 9 further comprising passing the heated particles, vaporous reactive feed and product material from the intermediate region of said reaction vessel to the upper region of said reaction vessel and quenching the vaporous reactive feed and product material, thereby cooling the heated particles after said contact, and removing the resulting cool product or products and reactive material from said reaction zone.

11. The process of claim 10 wherein said heated particles contacting with said vaporous reactive feed materials are maintained between 1300 and 2000° C.

12. The process of claim 11 wherein said vaporous reactive feed materials are selected from a group consisting of a vaporous paraffinic hydrocarbons and ammonia, said plasma flame is a plasma flame selected from the group consisting of hydrogen plasma flame and nitrogen plasma flame, said refractive particles comprise particles selected from the group consisting of graphite particles and carbon particles, and said products comprise acetylene and hydrogen cyanide.

13. The process of claim 12 wherein said vaporous paraffinic hydrocarbons comprise methane and said quenching comprises spraying water on said vaporous reactive feed and product material and said heated particles after said contact.

References Cited

UNITED STATES PATENTS

| 3,114,691 | 12/1963 | Case | 23—151 |
| 3,136,705 | 6/1964 | Sommers | 23—284 |

OTHER REFERENCES

Marynowski et al.: "Thermodynamics of Selected Chemical Systems potentially Applicable to Plasma Jet Synthesis," Industrial and Engineering Chemistry Fundamentals, vol. 1, No. 1, February 1962, pp. 52–61.

Stokes et al.: "The Plasma Jet in Chemical Synthesis," Industrial and Engineering Chemistry, vol. 52, No. 4, April 1960, pp. 287–288.

MILTON WEISSMAN, *Primary Examiner.*

OSCAR R. VERTIZ, *Examiner.*

H. S. MILLER, *Assistant Examiner.*